Dec. 19, 1967 M. P. RINGLEY 3,358,920

DEVICE FOR STORING AND RETRIEVING INFORMATION

Filed June 13, 1966 2 Sheets-Sheet 1

Fig. I

INVENTOR

Michael B. Ringley

BY Marion P. Lelong

AGENT

DEVICE FOR STORING AND RETRIEVING INFORMATION

Filed June 13, 1966 2 Sheets-Sheet 2

INVENTOR
Michael B. Ringley

BY Marion P. LeLong
AGENT

United States Patent Office 3,358,920

Patented Dec. 19, 1967

3,358,920

DEVICE FOR STORING AND RETRIEVING INFORMATION

Michael B. Ringley, Charleston Heights, S.C., assignor to West Virginia Pulp and Paper Company, New York, N.Y., a corporation of Delaware Filed June 13, 1966, Ser. No. 557,213
1 Claim. (Cl. 235—88)

ABSTRACT OF THE DISCLOSURE

A hand-held device for storing, retrieving, and correlating kraft pulping information on a plurality of data disks, containing data about paper properties and cooking results, that are divided into sectors, separated by sectorial slots having one-fourth the angular width of the sectors, the data on each data disk being arranged in four radial rows and in concentric circles, corresponding to duplicate sets of two active alkali pulping levels, two sulfidity levels, and one slowness level, the data disks being between and parallel to a bottom disk and a top disk and having rotatability, about a mutual central shaft, equalling five-fourths the angular width of a sector.

This invention relates to mechanical devices for storing and retrieving information and especially relates to hand-held devices for storing and retrieving data according to a selected relationship.

Many technical operations require the knowledge and utilization of large amounts of data. Financial operations involving interest rates, income tax, and insurance rates also may involve the retrieval, correlation, and utilization of numerous facts.

It is the object of this invention to provide a simple device that enables many items of technical information to be stored and retrieved as needed in a selectively related fashion.

In the drawings, an embodiment of the instant invention is illustrated with data for kraft cooking of hardwood in batch digesters.

The instant device comprises a bottom background disk, a top property disk, a plurality of intermediate data disks, a shaft that centrally transpierces all disks and is aligned perpendicularly thereto, and means for retaining the disks on the shaft. All disks are mutually parallel. A disk is herein defined as a flat circular plate having a center and a circular rim.

Figures 2, 3, 4:
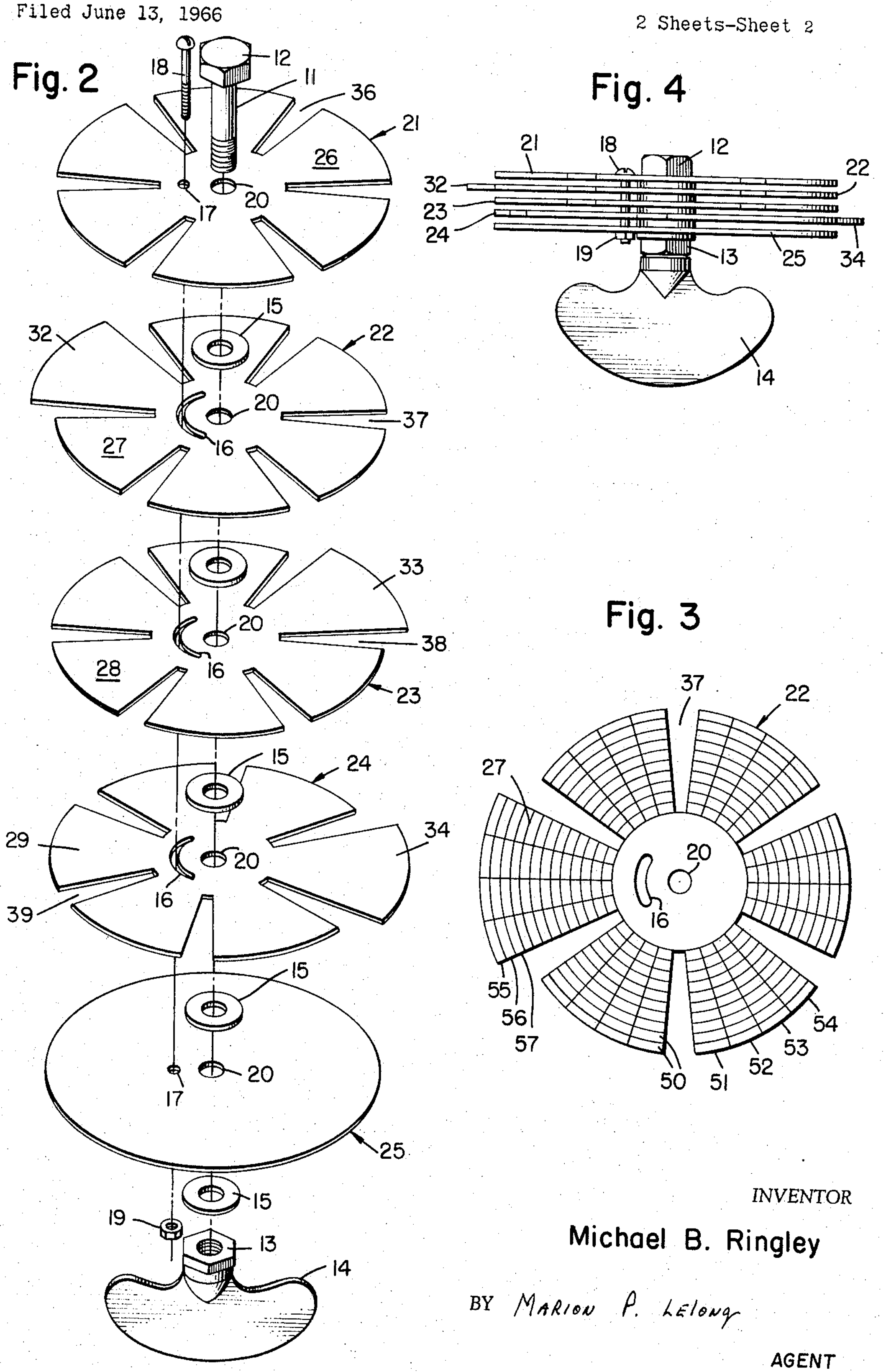
FIGURE 2 is an exploded perspective view of an embodiment of the invention wherein each part of the data relating device is visible in a working relationship.
FIGURE 3 is a plan view of a typical treatment disk that is stationed between the top property disk and the bottom background disk.
FIGURE 4 is a side view of a preferred embodiment of the invention.

As may best be seen in FIGURE 2, a threaded shaft 11, having head 12, is threaded into nuts 13 on butterfly grip 14. Head 12 and nuts 13 form retaining means for disks 21, 22, 23, 24, 25 that are centrally mounted on shaft 11 and separated by washers 15. These washers are preferably self-lubricating and are suitably made of Teflon.

Top property disk 21 is adjacent to head 12. Bottom background disk 25 is adjacent to nuts 13. Data disks 22, 23, 24 are between disks 21, 25.

Figure 1:
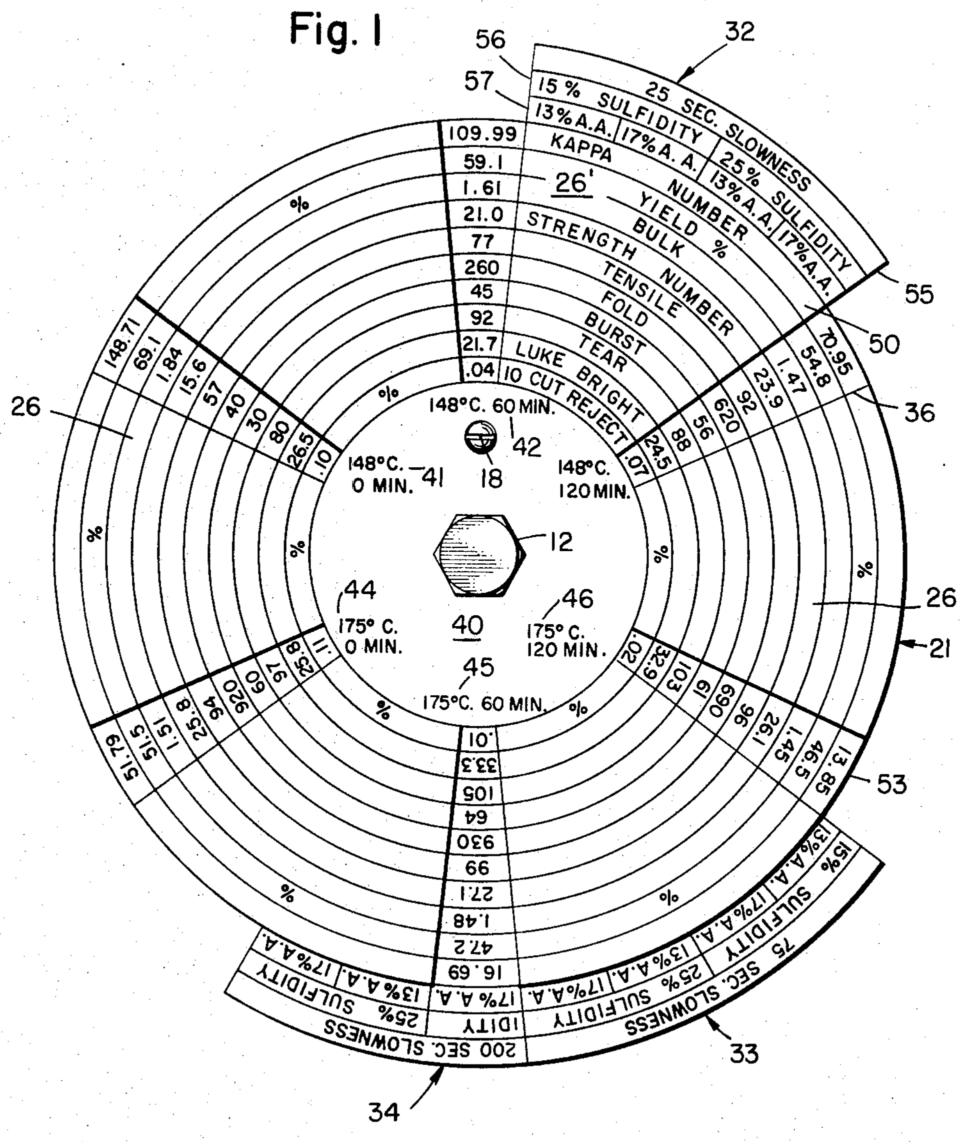
FIGURE 1 is a plan view of the data relating device that principally shows details of the property disk on top of the data relating device.

Each disk 21, 22, 23, 24 is deeply indented with sectorial information slots 36, 37, 38, 39, having equal angular width, which separate test sectors 26, 27, 28, 29, respectively. Each test sector has four times the angular width of an information slot 36, 37, 38, 39. As shown in FIGURES 1 and 3, every test sector is marked with concentric lines that delineate spaces for properties 50, such as "Kappa Number," Yield %," "Strength Number," etc., that are inscribed on one test sector 26′ of property disk 21, as shown in FIGURE 1 for the instant embodiment. Data are separated by radial lines into treatment files 51, 52, 53, 54 on each disk.

In the embodiment shown in the drawings, top property disk 21 and bottom background disk 25 are mutually immobilized by limit bolt 18 and nut 19 through holes 17. Intermediate data disks 22, 23, 24 are allowed a selected range of rotational freedom around shaft 11, equalling five times the angular width of an information slot 36, 37, 38, 39, by the length of arcuate slots 16 through which limit bolt 18 passes.

Test tabs 32, 33, 34 protrude from the rims of intermediate data disks 22, 23, 24, respectively. Each test tab 32, 33, 34 has a test layer 55, a condition layer 56, and a treatment layer 57, concentrically arranged in parallel to properties 50. In the embodiment shown, there are two conditions to each test and two treatments to each condition.

Information slots 37, 38, 39 as shown in FIGURE 2, separate respective test sectors 27, 28, 29 of each intermediate data disk 22, 23, 24 and must be equal in angular width to information slots 36. Test sectors 27, 28, 29 must also be equal in angular width to test sectors 26.

Data are arranged on concentric property circles 50 in treatment files 51, 52, 53, 54 that respectively show low-low, high-low, low-high, and high-high combinations of treatment-condition. Within inner zone 40 are six categories 41, 42, 43, 44, 45, 46, such as a cooking level of 148° C., 60 minutes at category 42, that are each located at the narrow end of the appropriate slot 36.

Background disk 25 may be solid, as in the embodiment shown in the drawings, or may be slotted in a manner similar to the other disks 21, 22, 23, 24. Data may be placed on the side of the background disk 25 that faces intermediate data disk 24 whether or not slots are employed, provided that a test tab is added to its rim.

If background disk is slotted and if a test tab is added to its rim, the reverse side may be utilized as a category disk having labelled test sectors. Similarly, the reverse sides of test tabs 32, 33, 34 and of intermediate test sectors 27, 28, 29 may be utilized for additional data identification and data, respectively. If a test tab is added to category disk 21, its reverse side may be utilized for data identification, and the reverse sides of test sectors 26 of category disk 21 may be used to display data.

By rotating a desired intermediate data disk 22, 23, or 24 with respect to shaft 11 and top disk 21, while all intermediate disks that are between top disk 21 and the desired disk are aligned so that information slots 36, 37, 38, or 39 coincide, a treatment file 51, 52, 53, or 54 can be clearly seen through slot 36 and any lower slots 37 or 38 that coincide. The treatment file 51, 52, 53, 54 that corresponds to the desired cooking category 41, 42, 43, 44, 45, 46 can then be selected, and the data for any desired property can be read within the appropriate concentric circle 50.

The embodiments, not shown in the drawings, that utilize the background disk 25 for data storage or, on reverse, as a data disk, require only that the data disks and background disk be relatively rotatable about shaft 11 with reference to disk 21. Limit bolt 18 and nut 19 may be omitted from this modification, although some helpful restriction in rotational movement is thereby lost. Property disk 21 is conveniently fixed with reference to shaft 11 by fashioning a portion of shaft 11 with non-circular cross section, disk 21 preferably having an opening 20 of matching shape and size.

The instant invention clearly stores large amounts of data. With 10 properties, 50 on each disk, 24 category-treatments on each disk, and four disks available, there are 960 bits of four-figure data available for storage if only one side of each disk is utilized. If both sides of all disks 21, 22, 23, 24, 25 are utilized, 2400 bits of data may be stored. Additional information can be stored if additional disks are added or if disks having a larger diameter are used.

I claim:

A hand-held device for storing, correlating and retrieving kraft pulping data, comprising:

(a) a bottom disk, (b) a top disk that is parallel to said bottom disk, comprising:

(1) a plurality of sectors having equal angular width and concentrically disposed circles inscribed thereupon, at least one sector having identifying descriptions of kraft paper properties and pulping results with reference to said circles, (2) a plurality of sectorial slots of equal angular width, each slot being bounded by test sectors and having an anguar width equalling one-fourth of the angular width of the test sectors, and (3) a central zone that contains data identifying each slot as to pulping time and temperature, (c) a plurality of data disks that are parallel to and between said bottom disk and said top disk, each data disk comprising:

(1) a central zone, (2) a plurality of sectors that coincide in width and spacing with the sectors in the top disk, each sector being divided into four radial files of equal angular width that contain data about paper properties and cooking results, arranged in concentric rows and in spatial correspondence with the concentric circles in the top disk, (3) a plurality of sectorial slots, separating the sectors, that coincide in width and spacing with the sectorial slots in the top disk, and (4) a tab, rigidly attached to each data disk, that is adjacent to the outer boundary of a sector and protrudes beyond the rim of said data disk, comprising:

(a) a concentric alkalinity layer, adjacent to said outer boundary, that is divided into four equal parts, each part having one of two active alkali pulping levels inscribed thereon, whereby differing levels are side-by-side, (b) a concentric sulfidity layer, adjacent to the alkalinity layer, that is divided into two equal parts, each part having one of two sulfidity levels inscribed thereon and each sulfidity level coinciding with both alkalinity levels in the alkalinity layer, and (c) a concentric slowness layer, adjacent to said sulfidity layer, having a slowness level inscribed thereon that coincides with both sulfidity levels and characterizes all data on said data disk, (d) a shaft that centrally transpierces all disks and is aligned perpendicularly thereto, (e) means for retaining said disks on said shaft, and (f) means for limiting the rotational movement of said data disks, comprising:

(1) an arcuate slot within the central zone of each data disk, each arcuate slot being equally spaced from the centrally transpiercing shaft and having an angular length equalling five times the angular width of the arcuate slots, and (2) a limit bolt that is rigidly attached to said top disk and to said bottom disk, is parallel to said shaft, and passes through all of said arcuate slots.

References Cited

UNITED STATES PATENTS

| | | | |
|---|---|---|---|
| 632,844 | 9/1899 | Payne | 235—88 |
| 3,070,903 | 1/1963 | Weedfald | 35—74 |

FOREIGN PATENTS

| | | |
|---|---|---|
| 156,060 | 7/1932 | Switzerland. |

RICHARD B. WILKINSON, *Primary Examiner.*

L. R. FRANKLIN, *Assistant Examiner.*